United States Patent

Harada et al.

[11] Patent Number: 6,067,801
[45] Date of Patent: May 30, 2000

[54] POWER OUTPUT APPARATUS AND METHOD OF CONTROLLING THE SAME

[75] Inventors: Osamu Harada; Katsuhiko Yamaguchi, both of Toyota; Yasuyuki Shibata, Susono, all of Japan

[73] Assignee: Toyota Jidosha Kabushiki Kaisha, Toyota, Japan

[21] Appl. No.: 09/178,573

[22] Filed: Oct. 26, 1998

[30] Foreign Application Priority Data

Nov. 12, 1997 [JP] Japan ...................................... 9-329430

[51] Int. Cl.[7] .................................................. F01B 21/04
[52] U.S. Cl. ............................................... 60/705; 60/706
[58] Field of Search ............................... 60/698, 705, 706

[56] References Cited

U.S. PATENT DOCUMENTS

| | | | |
|---|---|---|---|
| 4,439,989 | 4/1984 | Yamakawa | 60/706 X |
| 5,355,972 | 10/1994 | Wataya | 60/706 X |
| 5,528,901 | 6/1996 | Willis | 60/698 X |

FOREIGN PATENT DOCUMENTS

| | | |
|---|---|---|
| 6-121406 | 4/1994 | Japan . |
| 7-87615 | 3/1995 | Japan . |
| 8-19112 | 1/1996 | Japan . |
| 8-256403 | 10/1996 | Japan . |

*Primary Examiner*—Hoang Nguyen
*Attorney, Agent, or Firm*—Oliff & Berridge, PLC

[57] ABSTRACT

In a hybrid vehicle, there is a shock in a transient period when a driving condition of an internal combustion engine is shifted from a loaded driving state for power generation, in which a load is applied to the internal combustion engine by a motor generator, to a non-loaded driving state for idling or motoring, in which no load is applied to the internal combustion engine. A hybrid power output apparatus of the present invention, in which the motor generator is mechanically linked with the internal combustion engine, prevents an abrupt change in output torque from the motor generator in the transient period from the loaded driving state to the non-loaded driving state. One procedure to attain this object sets the minimum revolving speed of the internal combustion engine in the loaded driving state to be greater than the revolving speed in the non-loaded driving state by approximately 200 rpm. This setting enables the revolving speed of the internal combustion engine to gradually vary in the transient period from the loaded driving state to the non-loaded driving state, and prevents an abrupt change of the torque output from the motor generator, which is under the PI control based on the revolving speed of the internal combustion engine. This accordingly reduces a shock due to the abrupt change of the torque.

7 Claims, 11 Drawing Sheets

POWER OUTPUT APPARATUS AND METHOD OF CONTROLLING THE SAME

BACKGROUND OF THE INVENTION

1. Field of the Invention

The present invention relates to a power output apparatus having an internal combustion engine and a motor generator that is mechanically connected with the internal combustion engine and applies a significant load onto the internal combustion engine.

2. Description of the Related Art

Hybrid power output apparatuses having an internal combustion engine and a motor generator have recently been proposed as the power output apparatus, in which the motor generator is mechanically linked with the internal combustion engine and applies a significant loading torque to the internal combustion engine. The hybrid power output apparatuses include series-type hybrid power output apparatuses and parallel-type hybrid power output apparatuses. In the series-type hybrid power output apparatus, the power of the internal combustion engine is not directly transmitted to the drive shaft, but is regenerated in the form of electric power by the motor generator that is mechanically linked with the internal combustion engine. In the parallel-type hybrid power output apparatus, on the other hand, both the power of the internal combustion engine and the power of the motor generator are transmitted to the drive shaft. In one example of the parallel-type hybrid power output apparatus, the power output from the internal combustion engine is divided into the power portion transmitted to the drive shaft and the power portion transmitted to the motor generator. A second motor connected with the drive shaft is driven with the electric power generated by the motor generator, so that a required power is output to the drive shaft.

In the hybrid power output apparatus, the driving condition of the internal combustion engine is controlled by the parameters characteristic of the internal combustion engine, such as the quantity of fuel supply, as well as the loading torque and the revolving speed of the motor generator that is connected with the internal combustion engine. The power of the motor generator is output to the drive shaft. While there is a requirement for outputting the torque to the drive shaft, the internal combustion engine may be at a stop, at an idle, or in a motoring state to be forcibly rotated by the motor generator.

In the hybrid power output apparatus, however, a shock or an impulsive vibration for a relatively short time period may occur in the transient period when the driving condition of the internal combustion engine is shifted from the loaded driving state, in which a load is applied to the internal combustion engine by the motor generator, to the non-loaded driving state, in which no load is applied to the internal combustion engine. The driver and the passenger feel the shock when the hybrid power output apparatus is mounted on the vehicle. This damages the good ride of the hybrid vehicle.

In the parallel-type hybrid power output apparatus that uses gears for the power distribution mechanism, rattling noise of the gears may occur in the transient period. Since the hybrid power output apparatuses have been proposed just recently, such problems have not yet been even pointed out.

SUMMARY OF THE INVENTION

The object of the present invention is to provide a hybrid power output apparatus and an internal combustion engine control apparatus that prevent a shock and noise in a transient period when the driving condition of an internal combustion engine is shifted from a loaded driving state, in which a load is applied to the internal combustion engine by a motor generator, to a non-loaded driving state, in which no load is applied to the internal combustion engine.

At least part of the above and the other related objects is realized by a first power output apparatus having an internal combustion engine and a motor generator that is mechanically connected with the internal combustion engine and applies a significant load onto the internal combustion engine. The first power output apparatus includes a torque variation restricting unit that controls the internal combustion engine and the motor generator, in order to restrict a variation in torque output from the motor generator in a transient to or below a predetermined level, in said transient period, a driving condition of the internal combustion engine being shifted from a loaded driving state, in which a load is applied to the internal combustion engine by the motor generator, to a non-loaded driving state, in which no load is applied to the internal combustion engine.

In the first power output apparatus of the present invention, the torque variation restricting unit restricts the variation in output torque of the motor generator, which is mechanically linked with the internal combustion engine, in the transient period when the driving condition of the internal combustion engine is shifted from the loaded driving state to the non-loaded driving state, thereby effectively reducing the shock. Prior to the explanation of this function, the cause of the shock in the conventional power output apparatus is described. The present invention is based on the elucidation of this cause.

In the hybrid power output apparatus, the revolving speed of the internal combustion engine is controlled by regulating the load of the motor generator that is mechanically linked with the internal combustion engine. When the internal combustion engine is in the loaded driving state in the hybrid power output apparatus, the motor generator outputs a negative torque to rotate the internal combustion engine at a predetermined revolving speed. When the internal combustion engine is in the non-loaded driving state, on the other hand, the output torque of the motor generator is substantially zero. The output torque of the motor generator is feed-back controlled, in order to cause the revolving speed of the internal combustion engine to be kept at a predetermined level. The quantity of fuel injection and the other parameters relating to the internal combustion engine are regulated to enable the internal combustion engine to output the required power.

Here it is assumed that the driving condition of the internal combustion engine is shifted from the loaded driving state to the non-loaded driving state. In the loaded driving state, the internal combustion engine is required to output a predetermined power. The required power for the internal combustion engine decreases in the non-loaded driving state. Since the motor generator is feed-back controlled, the variation in required power for the internal combustion engine does not cause a variation in output torque of the motor generator. The motor generator accordingly continues outputting the negative torque, which is the output torque in the loaded driving state. The revolving speed of the internal combustion engine is lowered by the negative torque output from the motor generator. When the decreased revolving speed becomes lower than the target revolving speed in the non-loaded driving state, the feed-back control causes the motor generator to output a positive torque and raise the revolving speed of the internal combustion engine. The output torque of the motor generator thus remarkably varies from the negative value to zero or the positive value. While the conventional power output apparatus uses only the internal combustion engine as the power source, the hybrid power output apparatus has a large-sized motor generator. An abrupt torque change accordingly causes a significant shock. This phenomenon is especially remarkable when the power output apparatus in the loaded driving state is driven at the revolving speed that is close to the target revolving speed in the non-loaded driving state.

Such a phenomenon has not been reported with respect to the hybrid power output apparatus, and there have naturally been no analyses for the cause of this phenomenon. The applicants of the present invention have carried out a variety of experiments and analyses, elucidated the fundamental cause of the phenomenon, and developed the power output apparatus of the present invention. The power output apparatus of the present invention restricts the variation in output torque of the motor generator within a predetermined range in the transient state when the driving condition of the internal combustion engine is shifted from the loaded driving state to the non-loaded driving state, so as to reduce the shock.

A variety of means may be applicable to prevent a variation in output torque of the motor generator. One available arrangement carries out the open-loop control of the motor generator, instead of the feed-back control, in the transient period, so as to realize a gradual change of the output torque. Another available arrangement causes the torque command value determined by the feed-back control to be subjected to a variation limiting process, thereby depressing the variation in output torque.

In accordance with one preferable application of the power output apparatus, the torque variation restricting unit controls the internal combustion engine and the motor generator in the loaded driving state, so as to keep a minimum revolving speed of the internal combustion engine in the loaded driving state at a specific level that is greater than a target revolving speed in the non-loaded driving state by a predetermined value.

In this preferable structure, it is further desirable that the power output apparatus has a motor generator control unit that feed-back controls operation of the motor generator based on an observed revolving speed of the internal combustion engine. The predetermined value in the torque variation restricting unit depends upon a decrease in revolving speed of the internal combustion engine due to a time delay of control of the motor generator.

In the power output apparatus of this preferable structure, the minimum revolving speed of the internal combustion engine in the loaded driving state is kept to be greater than the target revolving speed in the non-loaded driving state by a predetermined value. Even when the required power for the internal combustion engine is decreased by the shift to the non-loaded driving state, the decreased revolving speed of the internal combustion engine does not become significantly lower than the target revolving speed in the non-loaded driving state. There is accordingly no need of abruptly changing the output torque of the motor generator from the negative value to the positive value, for the purpose of increasing the revolving speed of the internal combustion engine. This arrangement thus effectively prevents the shock.

In accordance with another preferable application of the power output apparatus, the motor generator is a first motor generator, and the motor generator control unit is a first motor generator control unit. The power output apparatus further includes: a drive shaft for outputting power; a second motor generator that applies a torque to the drive shaft; and a second motor generator control unit that regulates a torque output from the second motor generator, in order to cause a torque output from the drive shaft to be coincident with a required torque. The torque variation restricting unit feed-back controls operation of the first motor generator at a specific speed of response that is lower than a speed of response of the second motor generator control unit.

In the power output apparatus of this preferable application, the torque output from the second motor generator is regulated, in order to make the torque output from the drive shaft coincident with the required torque. Even if there is a variation in output torque of the first motor generator that is mechanically linked with the internal combustion engine, the second motor generator cancels this variation and thereby effectively reduces the shock. It is required that the variation in torque output from the second motor generator sufficiently follows the torque variation of the first motor generator. In the power output apparatus of this preferable structure, the speed of response of the first motor generator is set lower than the speed of response of the second motor generator. This enables the torque variation of the first motor generator to be cancelled.

In accordance with still another preferable application of the present invention, the power output apparatus further includes: a drive shaft for outputting power; and a planetary gear having three rotating shafts, wherein the three rotating shafts of the planetary gear are respectively connected with the internal combustion engine, the motor generator, and the drive shaft.

In this power output apparatus, the internal combustion engine, the motor generator, and the drive shaft are mechanically linked with one another via the planetary gear. The variation in torque of the motor generator accordingly tends to be directly transmitted to the drive shaft. Application of the present invention thus significantly reduces the shock. When a specific condition is fulfilled between the torques input to the respective rotating shafts of the planetary gear, rattling noise of the gears may occur in the planetary gear, as empirically known. The cause of the rattling noise has not yet been elucidated completely, but may be ascribed to an abrupt change of the torque input into each rotating shaft. The structure of the present invention prevents a torque variation of the motor generator, and thereby reduces the rattling noise.

The present invention is also directed to a second power output apparatus having an internal combustion engine and a motor generator that is mechanically connected with the internal combustion engine and applies a significant load onto the internal combustion engine. The second power output apparatus includes: a motor generator control unit that feed-back controls operation of the motor generator based on a revolving speed of the internal combustion engine; and an internal combustion engine control unit that controls the internal combustion engine, so as to keep a minimum revolving speed of the internal combustion engine in a loaded driving state at a specific level that is greater than a target revolving speed in a non-loaded driving state by a predetermined value, wherein a load is applied to the internal combustion engine by the motor generator in the loaded driving state, whereas no load is applied to the internal combustion engine in the non-loaded driving state.

Like the first power output apparatus, the second power output apparatus of the present invention can reduce the shock in the transient period when the driving condition of the internal combustion is shifted from the loaded driving state to the non-loaded driving state. Based on the similar principle, this power output apparatus can also reduce the shock in the transient period when the driving condition of the internal combustion engine is shifted from the non-loaded driving state to the loaded driving state. The output torque of the motor generator is substantially zero in the non-loaded driving state. At the time when the internal combustion engine starts outputting the torque in the course of the shift to the loaded driving state, the output torque of the motor generator is kept substantially equal to zero, because of the time delay of the control. The revolving speed of the internal combustion engine accordingly becomes higher than the revolving speed in the non-loaded driving state. The motor generator is feed-back controlled, in order to cause the internal combustion engine to be rotated at the target revolving speed in the loaded driving state. In the second power output apparatus, the minimum revolving speed of the internal combustion engine in the loaded driving state is set to be greater than the target revolving speed in the non-loaded driving state. The increase in revolving speed due to the time delay of the control causes the revolving speed of the internal combustion engine to approach to the target revolving speed in the loaded driving state. The feed-back control thus effectively prevents a large torque variation of the motor generator.

The present invention is further directed to a method of controlling a power output apparatus having an internal combustion engine and a motor generator that is mechanically connected with the internal combustion engine and applies a significant load onto the internal combustion engine. The method includes the steps of: (a) driving the internal combustion engine and the motor generator in a loaded driving state where a load is applied to the internal combustion engine by the motor generator; (b) driving the internal combustion engine and the motor generator in a non-loaded driving state where no load is applied to the internal combustion engine; and (c) controlling the internal combustion engine and the motor generator, in order to restrict a variation in torque output from the motor generator to or below a predetermined level, in a transient period between the step (a) and the step (b).

Because of the same effects as those discussed above, the control method of the present invention reduces the shock applied to the power output apparatus in the course of a shift between the loaded driving state and the non-loaded driving state. A variety of control techniques corresponding to the variety of applications discussed above with respect to the power output apparatus may be adopted for the control of the step (c). For example, the motor generator may be controlled by the open-loop control in the course of a shift between the step (a) and the step (b). The minimum revolving speed of the internal combustion engine in the loaded driving state may be controlled to be greater than the target revolving speed in the non-loaded driving state.

These and other objects, features, aspects, and advantages of the present invention will become more apparent from the following detailed description of the preferred embodiment with the accompanying drawings.

DESCRIPTION OF THE PREFERRED EMBODIMENT (1) Structure of Embodiment

Figure 1:
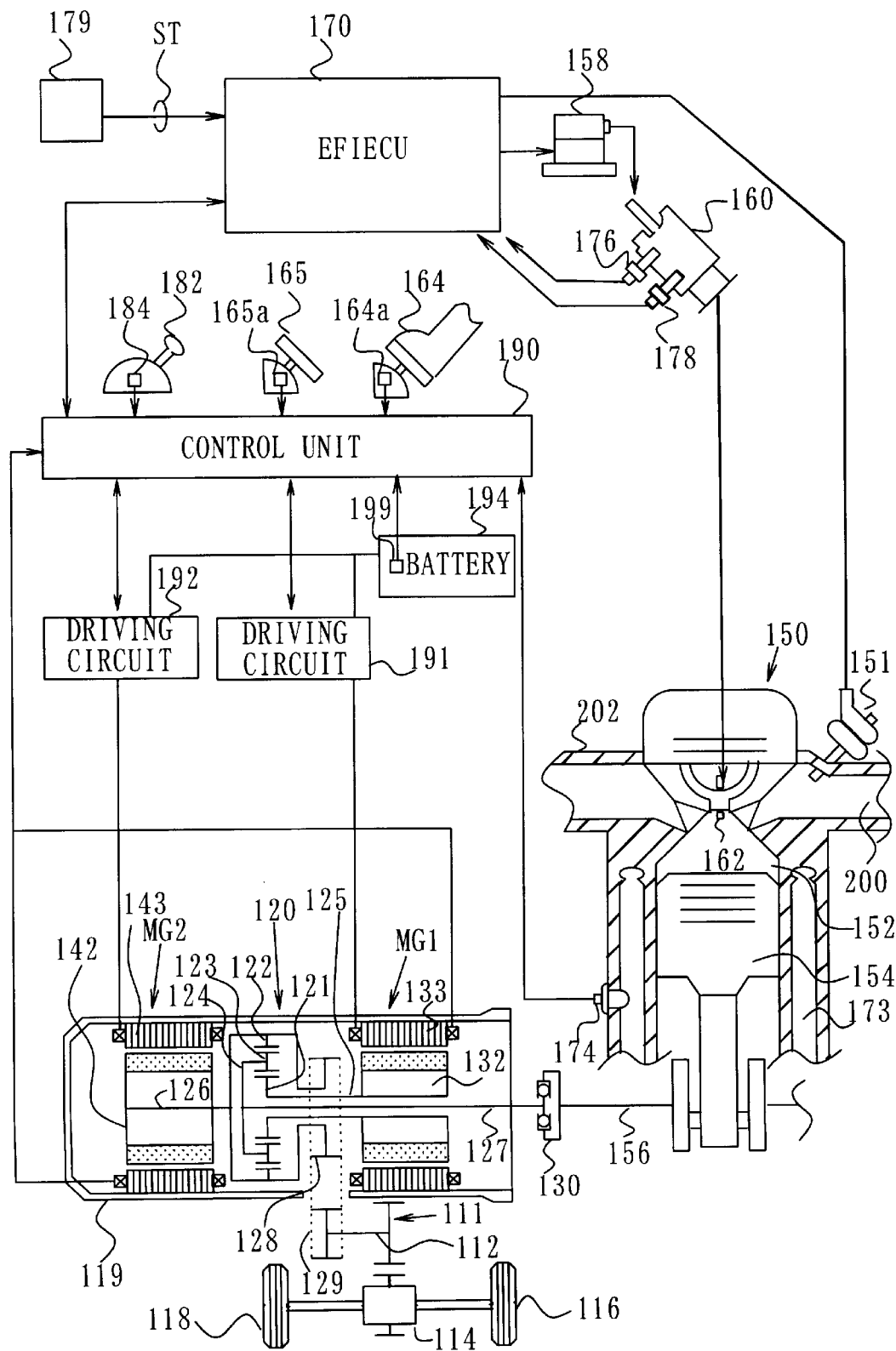
FIG. 1 schematically illustrates the structure of a hybrid vehicle with a power output apparatus that embodies the present invention and is mounted on the vehicle.

The structure of one embodiment is described with the drawing of FIG. 1. The hybrid vehicle mainly includes a power system for generating a driving force, a control system for controlling the power system, a power transmission system for transmitting the driving force from a driving source to driving wheels 116 and 118, and a driving operation unit. The power system is divided into two sub-systems, that is, a sub-system including an engine 150 and a sub-system including motors MG1 and MG2. The control system includes an electronic control unit (hereinafter referred to as EFIECU) 170 that mainly controls operations of the engine 150, a control unit 190 that mainly controls operations of the motors MG1 and MG2, and a variety of sensors that detect, input, and output signals required for the EFIECU 170 and the control unit 190. Although the internal structures of the EFIECU 170 and the control unit 190 are not illustrated, these are one-chip microcomputers including a CPU, a ROM, and a RAM. The CPU executes a variety of control processes discussed below according to programs recorded on the ROM.

In the engine 150, the air ingested from an air inlet 200 is mixed with a fuel, that is, gasoline in this embodiment, injected from a fuel injection valve 151. The air/fuel mixture is supplied into a combustion chamber 152 to be explosively ignited and combusted therein. Linear motions of a piston 154 pressed down by the combustion of the air/fuel mixture are converted into rotational motions of a crankshaft 156. An ignition plug 162 converts a high voltage applied from an igniter 158 via a distributor 160 to an electric spark, which explosively ignites and combusts the air/fuel mixture. The hot combustion exhaust is released to the air via an exhaust outlet 202.

The operation of the engine 150 is controlled by the EFIECU 170. The control operations of the engine 150 carried out by the EFIECU 170 include ignition timing control of the ignition plug 162 according to the revolving speed of the engine 150 and regulation of the amount of fuel injection according to the quantity of the ingested air. In order to realize the control of the engine 150, a variety of sensors that detect the driving conditions of the engine 150 are connected to the EFIECU 170. These sensors include, for example, a speed sensor 176 and an angle sensor 178 mounted on the distributor 160 for measuring the revolving speed (the number of revolutions per a predetermined time period) and the rotational angle of the crankshaft 156. A starter switch 179 for detecting a state ST of an ignition key (not shown) is also connected to the EFIECU 170. For convenience of explanation, other sensors and switches connecting with the EFIECU 170 are omitted from the illustration.

The motors MG1 and MG2 that are also included in the power system have the structures discussed below. The motor MG1 is constructed as a synchronous motor generator and includes a rotor 132 having a plurality of permanent magnets on its outer surface and a stator 133 having three-phase coils wound thereon to form a revolving magnetic field. The stator 133 is manufactured by laying thin plates of non-directional electromagnetic steel one upon another and is fixed to a casing 119. In some occasions, the motor MG1 works as a motor that rotates the rotor 132 through the interaction between a magnetic field created by the permanent magnets on the rotor 132 and a magnetic field created by the three-phase coils on the stator 133. In other occasions, the motor MG1 works as a generator that generates an electromotive force on either ends of the three-phase coils on the stator 133 through this interaction.

Like the motor MG1, the motor MG2 is also constructed as a synchronous motor generator and includes a rotor 142 having a plurality of permanent magnets on its outer surface and a stator 143 having three-phase coils wound thereon to form a revolving magnetic field. The stator 143 of the motor MG2 is also manufactured by laying thin plates of non-directional electromagnetic steel one upon another and is fixed to the casing 119. Like the motor MG1, the motor MG2 may work as a motor or a generator.

These motors MG1 and MG2 are electrically connected with a battery 194 and the control unit 190 via first and second driving circuits 191 and 192, which respectively include a plurality of transistors for switching operations. The control unit 190 outputs control signals for driving six switching elements or transistors respectively included in the first and the second driving circuits 191 and 192. The six transistors in each of the driving circuits 191 and 192 are arranged in pairs to work as a source and a drain and thereby constitute a transistor inverter. The control unit 190 successively outputs control signals to control the ratio of the ON-time of the transistors in the source and in the drain. This PWM (pulse-width modulation) control causes the electric currents flowing through the respective phases of the three-phase coils to form quasi-sine waves. The three-phase coils then generate revolving magnetic fields and drive these motors MG1 and MG2.

A variety of sensors and switches are electrically connected to the control unit 190, in order to enable the control of the driving state of the hybrid vehicle, which includes the control of the motors MG1 and MG2. The sensors and the switches connected to the control unit 190 include an accelerator position sensor 164a, a brake pedal position sensor 165a, a gearshift position sensor 184, a water temperature sensor 174, and a remaining charge meter 199 of the battery 194. The control unit 190 receives a variety of signals from the driving operation unit via these sensors and the observed remaining charge of the battery 194, and transmits various pieces of information to and from the EFIECU 170 for controlling the engine 150 through communication. The variety of signals from the driving operation unit include an accelerator position (a step-on amount of an accelerator 164) AP from the accelerator position sensor 164a, a brake pedal position (a step-on amount of a brake pedal 165) BP from the brake pedal position sensor 165a, and a gearshift position SP from the gearshift position sensor 184. The remaining charge meter 199 measures the remaining charge of the battery 194. The remaining charge meter 199 may determine the remaining charge of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The power transmission system for transmitting the driving force from the driving source to the driving wheels 116 and 118 has the structure discussed below. The crankshaft 156 for transmitting the power of the engine 150 is linked with a planetary carrier shaft 127 via a damper 130. The planetary carrier shaft 127 and a sun gear shaft 125 and a ring gear shaft 126 for respectively transmitting rotations of the motors MG1 and MG2 are mechanically linked with a planetary gear 120 discussed later. The damper 130 connects the crankshaft 156 of the engine 150 with the planetary carrier shaft 127 and restricts the amplitude of torsional vibrations of the crankshaft 156.

A power feed gear 128 for taking out the power is linked with a ring gear 122 and arranged between the ring gear 122 and the motor MG1. The power feed gear 128 is further connected to a power transmission gear 111 via a chain belt 129, so that the power is transmitted between the power feed gear 128 and the power transmission gear 111. The power transmission gear 111 is further connected with the left and right driving wheels 116 and 118 via a differential gear 114, so as to transmit the power to these wheels 116 and 118.

The following describes the structure of the planetary gear 120 and the linkage of the crankshaft 156, the planetary carrier shaft 127, the sun gear shaft 125 as the rotating axis of the motor MG1, and the ring gear shaft 126 as the rotating axis of the motor MG2. The planetary gear 120 includes coaxial two gears, that is, a sun gear 121 and the ring gear 122, and a plurality of planetary pinion gears 123 that are arranged between the sun gear 121 and the ring gear 122 to revolve around the sun gear 121 while rotating on its axis. The sun gear 121 is linked with the rotor 132 of the motor MG1 via the hollow sun gear shaft 125 which the planetary carrier shaft 127 passes through. The ring gear 122 is linked with the rotor 142 of the motor MG2 via the ring gear shaft 126. The planetary pinion gears 123 are connected with the planetary carrier shaft 127 via the planetary carrier 124 that supports the rotating axes of the planetary pinion gears 123. The planetary carrier shaft 127 is connected with the crankshaft 156. As is known in the field of mechanics, determination of the revolving speeds of and the torques input to and output from any two shafts among the three shafts, that is, the sun gear shaft 125, the ring gear shaft 126, and the planetary carrier shaft 127, automatically determines the revolving speed of and the torques input to and output from the residual one shaft.

(2) General Operations

The following briefly describes the general operations of the hybrid vehicle of the embodiment. While the hybrid vehicle of the above structure runs in the ordinary state, the power corresponding to the required power to be output from the drive shaft 112 is output from the engine 150, subjected to torque conversion discussed below, and transmitted to the drive shaft 112. In the case where the crankshaft 156 of the engine 150 rotates at the higher revolving speed and with the lower torque than the required revolving speed and the required torque to be output to the drive shaft 112, for example, the torque conversion causes the motor MG1 to recover part of the power output from the engine 150 as electric power and drives the motor MG2 with the recovered electric power. The planetary gear 120 divides the power output from the engine 150 into a power portion transmitted to the motor MG1 connected with the sun gear shaft 125 and a power portion transmitted to the drive shaft 112 via the ring gear shaft 126. The power distribution is carried out under the condition that the revolving speed of the ring gear shaft 126 coincides with the required revolving speed. The motor MG1 regenerates the power portion transmitted to the sun gear shaft 125 as the electric power. The motor MG2 linked with the ring gear shaft 126 is driven with the regenerated electric power, so that a torque is applied to the ring gear shaft 126. The application of the torque enables the required torque to be output to the drive shaft 112. Such regulation of the power transmitted in the form of the electric power via the motors MG1 and MG2 enables the power output from the engine 150 to be output as the desired revolving speed and the desired torque to the drive shaft 112.

In the case where the crankshaft 156 of the engine 150 rotates at the lower revolving speed and with the higher torque than the required revolving speed and the required torque to be output to the drive shaft 112, on the other hand, the motor MG2 recovers parts of the power output from the engine 150 as electric power. The motor MG1 is then driven with the recovered electric power.

Based on these operating principles, the hybrid vehicle may run only with the motor MG2 as the driving source or alternatively run with both the engine 150 and the motor MG2 as the driving source. At the time of initial acceleration of the hybrid vehicle or at the time when the engine power is not required, for example, during a reduction of the speed or a downslope run, the hybrid vehicle stops operation of the engine 150 and runs only with the motor MG2. During a run in the ordinary state, on the other hand, the hybrid vehicle runs with the power of both the engine 150 as the main driving source and the motor MG2 as the auxiliary driving source. When both the engine 150 and the motor MG2 are used as the driving source, the engine 150 can be driven at an efficient driving point according to the required torque and the torque that can be generated by the motor MG2. Compared with the vehicle that uses only the engine 150 as the driving source, this arrangement of the hybrid vehicle effectively saves the resource and has less emission. Rotation of the crankshaft 156 is transmitted to the motor MG1 via the planetary carrier shaft 127 and the sun gear shaft 125. The motor MG1 can thus generate the electric power through the operation of the engine 150 during a run of the hybrid vehicle.

Figure 2:
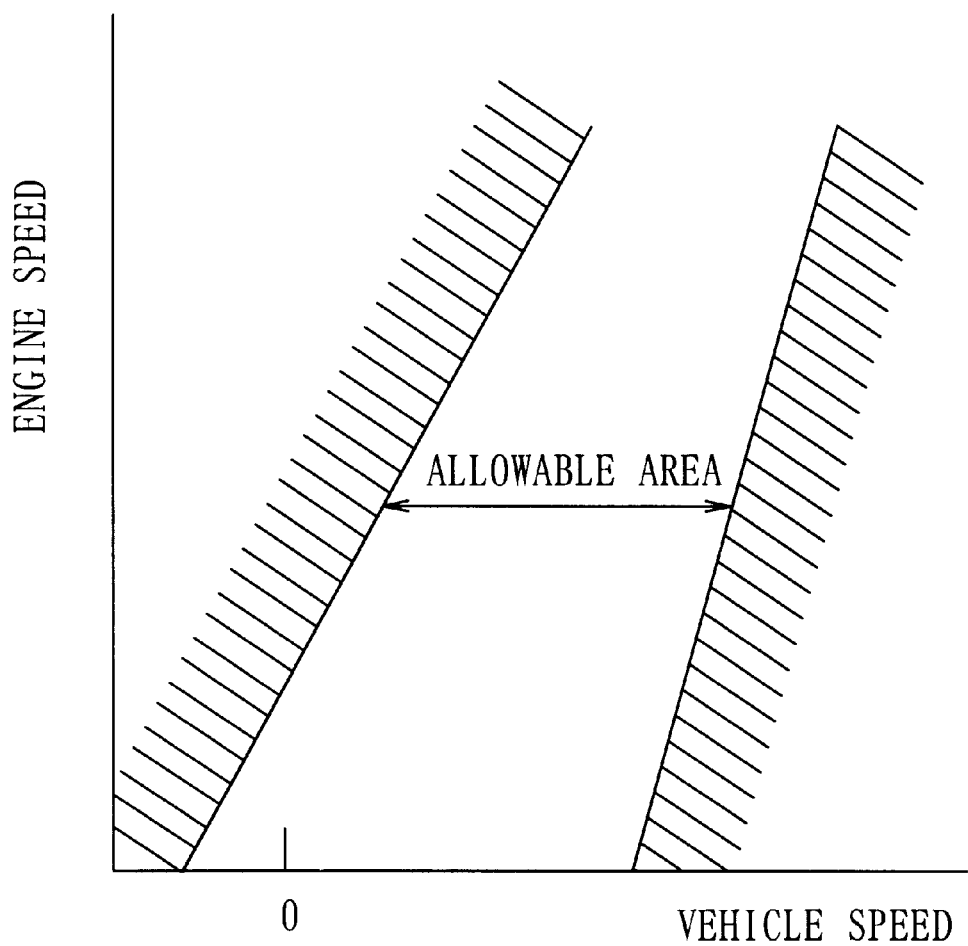
FIG. 2 is a graph showing restriction of the revolving speed of an engine.

In the hybrid vehicle of the embodiment, the mechanical limit with respect to the revolving speeds of the planetary gear 120 used in the torque conversion restricts the allowable revolving speed range of the engine 150 against the vehicle speed as shown in the graph of FIG. 2. Such restriction exists because of the following reason. As is known, in the planetary gear 120, the relationship of Equation (1) given below is held between a revolving speed Ns of the sun gear shaft 125, a revolving speed Nc of the planetary carrier shaft 127, and a revolving speed Nr of the ring gear shaft 126, where $\rho$ denotes the gear ratio of the sun gear 121 to the ring gear 122 (that is, the number of teeth of the sun gear 121 to the number of teeth of the ring gear 122). In this embodiment, the revolving speed Nr of the ring gear shaft 126 is the parameter equivalent to the vehicle speed, whereas the revolving speed Nc of the planetary carrier shaft 127 is the parameter equivalent to the revolving speed of the engine 150.

$$Ns=Nc+(Nc-Nr)/\rho \qquad (1)$$

The revolving speed of the sun gear shaft 125 has a mechanical limit. The maximum revolving speed Nc of the planetary carrier shaft 127 accordingly varies with a variation in revolving speed Nr of the ring gear shaft 126 under this restriction. The revolving speed Nc reaches the minimum at the revolving speed Nr=0 and gradually increases with an increase in revolving speed Nr. Because of this reason, the limit of the revolving speed of the engine 150 varies according to the vehicle speed. As shown in the graph of FIG. 2, the upper limit of the allowable revolving speed range of the engine 150 gradually increases with an increase in vehicle speed. Because of the same reason, the lower limit of the allowable revolving speed range appears at or above a predetermined vehicle speed.

(3) Torque Control Process

Figure 3:
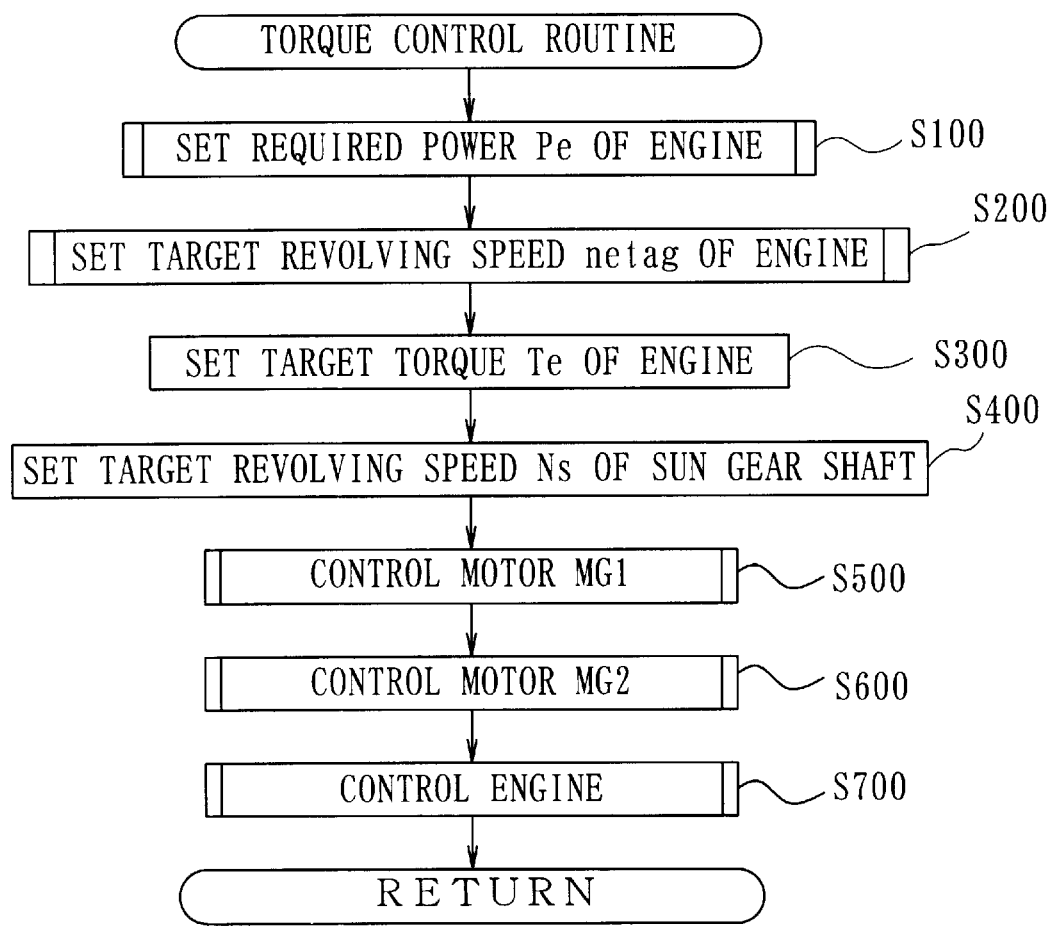
FIG. 3 is a flowchart showing a torque control routine executed in the embodiment.

The following describes a torque control process executed in this embodiment. The torque control process controls the engine 150 and the motors MG1 and MG2, in order to enable the power defined by the required torque and the required revolving speed to be output from the drive shaft 112. The flowchart of FIG. 3 shows a torque control routine executed in this embodiment. This torque control routine is repeatedly executed through timer interruption at predetermined time intervals by the CPU in the control unit 190 (hereinafter simply referred to as the CPU).

When the program enters the torque control routine of FIG. 3, the CPU sets a required power Pe of the engine 150 at step S100. The details of the setting at step S100 are described with the flowchart of FIG. 4.

Figure 4:
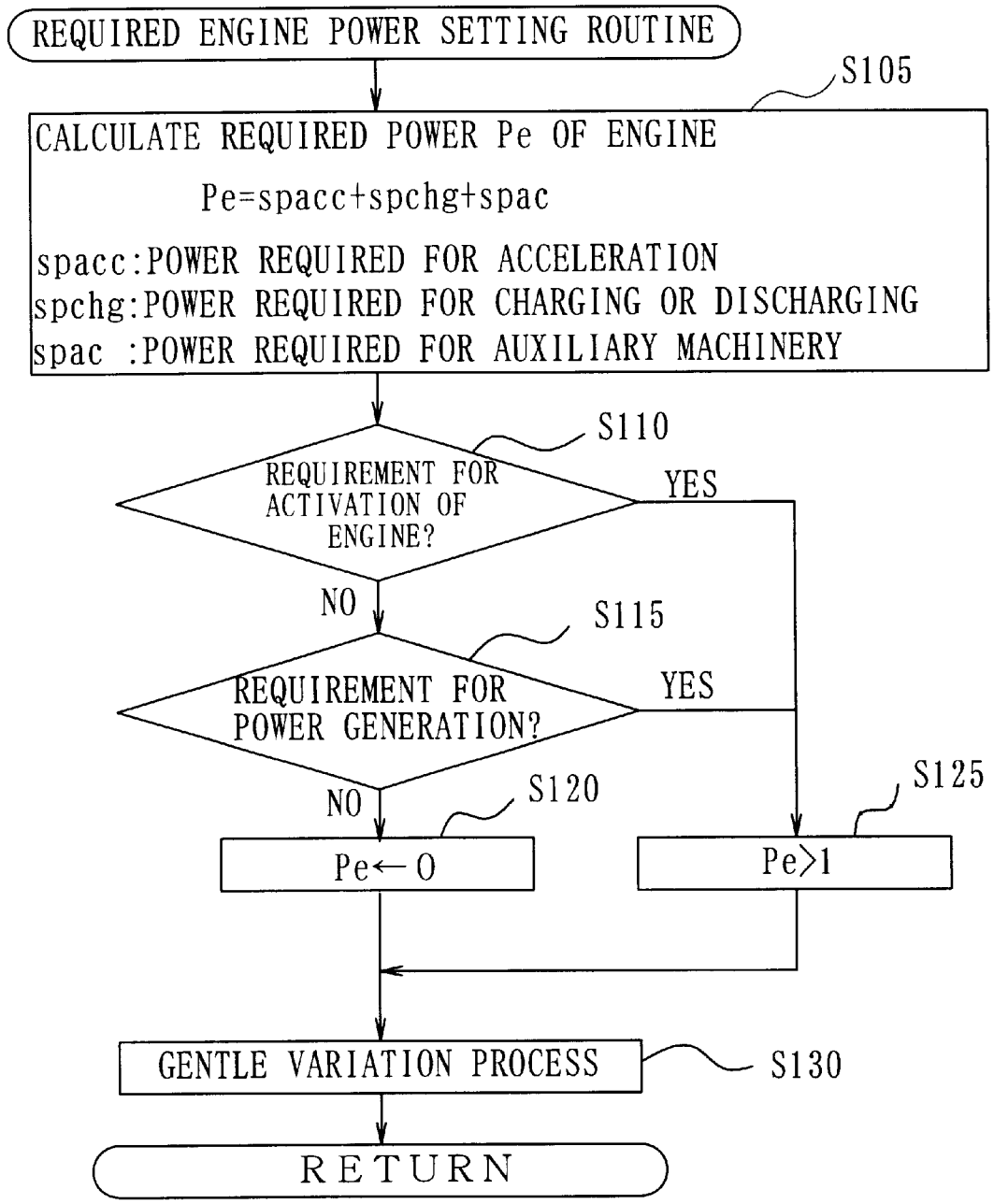
FIG. 4 is a flowchart showing details of the required engine power setting process executed at step S100 in the flowchart of FIG. 3.

In the required engine power setting routine of FIG. 4, the CPU calculates the required power Pe of the engine 150 as the sum of a power spacc required for acceleration, a power spchg required for charging or discharging, and a power spac required for auxiliary machinery at step S105. The power spacc required for acceleration depends upon the vehicle speed and the step-on amount of the accelerator 164. The power spchg required for charging or discharging depends upon the remaining charge of the battery 194. The power spac required for auxiliary machinery is, for example, used to drive an air conditioner. Although being not specifically shown in the flowchart of FIG. 4, the CPU reads the vehicle speed, the accelerator position AP, and other required data from the variety of sensors shown in FIG. 1, in order to calculate these powers.

After calculating the required power Pe of the engine 150, the CPU determines whether or not activation of the engine 150 is required at step S110. As discussed previously, the hybrid vehicle of the embodiment can run while the engine 150 is at a stop. According to the requirement for activation of the engine 150, the state of the engine 150 shifts from the ceased condition to the driving condition in which the injected fuel is combusted to generate the power. In the case where the vehicle speed is relatively low at a start of a run, the hybrid vehicle of the embodiment drives with the output torque of the motor MG2 while the engine 150 is at a stop. The requirement for activation of the engine 150 is issued when the vehicle speed increases and the operation of the engine 150 is required. The requirement for activation of the engine 150 is output when the state of the engine 150 is to be shifted from the ceased condition to the driving condition or alternatively when the engine 150 is under the activation control.

In the case where there is no requirement for activation of the engine 150, the CPU subsequently determines whether or not power generation is required at step S115. The requirement for power generation is issued when the remaining charge of the battery 194 is lowered. According to the requirement for power generation, the motor MG1 generates electric power by utilizing the power of the engine 150 and the battery 194 is charged with the generated electric power. The requirement for power generation is output when a start of power generation is required due to a decrease in remaining charge of the battery 194 or alternatively when the power generation is under way.

In the case where there is no requirement for power generation, the CPU determines that the engine 150 is not required to output the power and sets the value '0' to the required power Pe of the engine 150 at step S120. In this case, the power space required for acceleration is supplied in the form of electric power from the battery 194.

In the case where there is either a requirement for activation of the engine 150 (step S110) or a requirement for power generation (step S115), the value of the required power Pe calculated at step S105 is used for the subsequent processing. If the required power Pe is less than the value '1', however, the CPU sets the value '1' to the required power Pe and ascertains that the minimum value of the required power Pe is not less than 1 at step S125. In the hybrid vehicle of the embodiment, an engine control process (executed at step S700 in the flowchart of FIG. 3 as discussed later) determines no requirement for continuous operation of the engine 150 and stops the engine 150 when the required power Pe of the engine 150 is smaller than the value '1'. The setting of the lower limit to the required power Pe at step S125 aims to avoid the stop of the engine 150 in this control procedure. When another condition is adopted to determine a stop or a continuous operation of the engine 150, it is not required to set the lower limit to the required power Pe.

At subsequent step S130, the CPU carries out a gentle variation process according to the required power Pe of the engine 150 set in the above manner. For the stable operation of the engine 150, the rate of change in required power Pe should be in the range where the control of the engine 150 by the EFIECU 170 can follow. In the gentle variation process, the CPU reads the previous required power obtained in the previous cycle of this routine and corrects the required power Pe of the engine 150, in order to make the difference between the current required power Pe set in the current cycle of this routine and the previous required power within a predetermined range.

After setting the required power Pe of the engine 150, the CPU sets a target revolving speed netag of the engine 150 at step S200 in the flowchart of FIG. 3. The details of setting at step S200 are described with the flowchart of FIG. 5.

Figure 5:
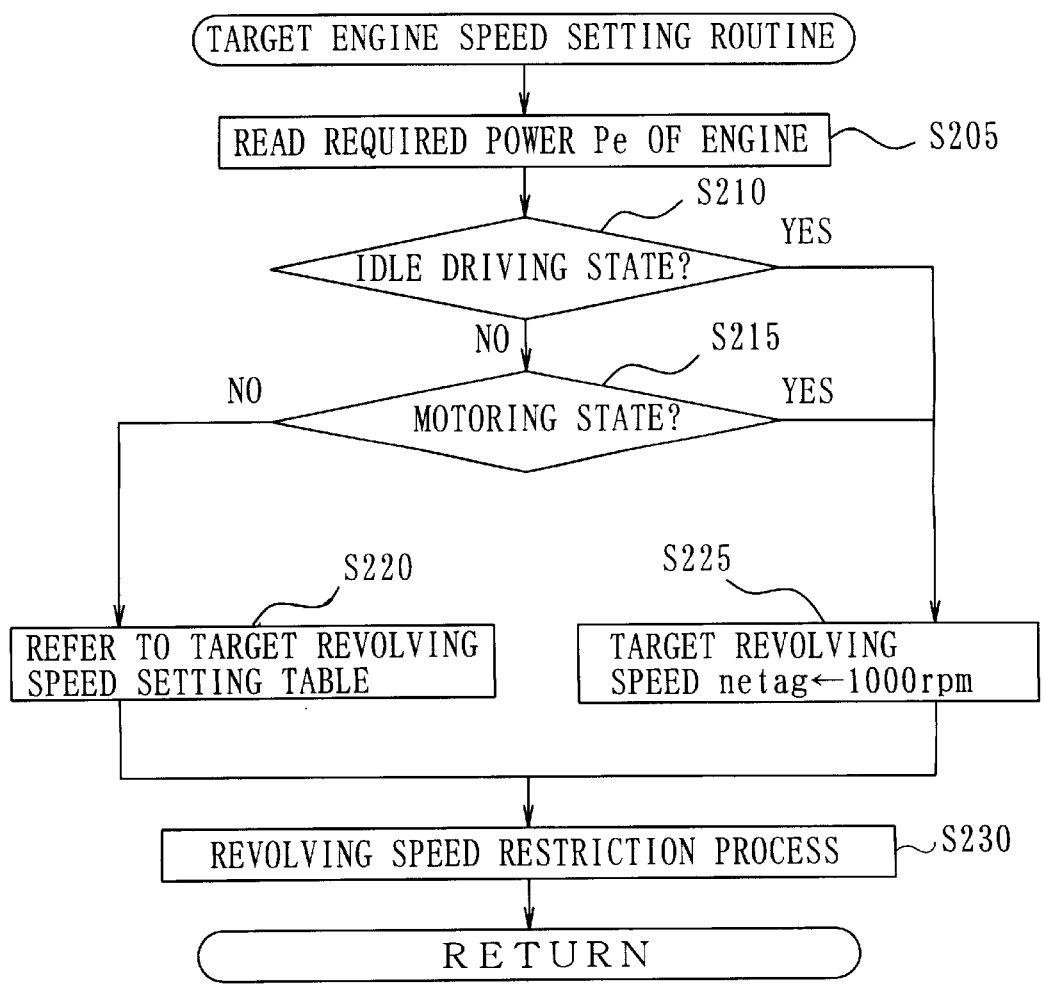
FIG. 5 is a flowchart showing details of the target engine speed setting process executed at step S200 in the flowchart of FIG. 3.

In the target engine speed setting routine of FIG. 5, the CPU first reads the required power Pe of the engine 150 at step S205. The required power Pe has been set in the required engine power setting routine shown in the flowchart of FIG. 4 and discussed previously.

The CPU then determines whether or not the engine 150 is in an idle driving state at step S210. The idle driving state implies that the engine 150 does not output a significant power but rotates without being motored by the power of the motor MG1 or the like. This idle driving state occurs, for example, when warm-up of the engine 150 is required. A concrete procedure of step S210 determines whether or not a condition for driving the engine 150 in the idle driving state is fulfilled. The condition is satisfied when the engine 150 is at an idle or alternatively when the state of the engine 150 is to be shifted to the idle driving state.

In the case where the engine 150 is not in the idle driving state, the CPU subsequently determines whether or not the engine 150 is in a motoring state at step S215. The motoring state implies that the crankshaft 156 of the engine 150 is forcibly rotated by the torque of the motor MG1 or the motor MG2. This motoring state occurs, for example, when there is a fear of excessively charging the battery 194 and the engine 150 is required to motor with a view to consuming the electric power, or when the engine 150 is required to motor prior to a start for the purpose of warming up the engine 150. Both the idle driving state and the motoring state correspond to the driving state where no load is applied to the engine 150 and are hereinafter collectively referred to as the non-loaded driving state. Any other driving states where some load is applied to the engine 150 are collectively referred to as the loaded driving state.

When the engine 150 is in the non-loaded driving state, that is, either in the idle driving state (step S210) or in the motoring state (step S215), the CPU sets the target revolving speed netag of the engine 150 equal to 1000 rpm at step S225. The target revolving speed 1000 rpm is specified, based on the minimum revolving speed that allows stable operation of the engine 150.

Figure 6:
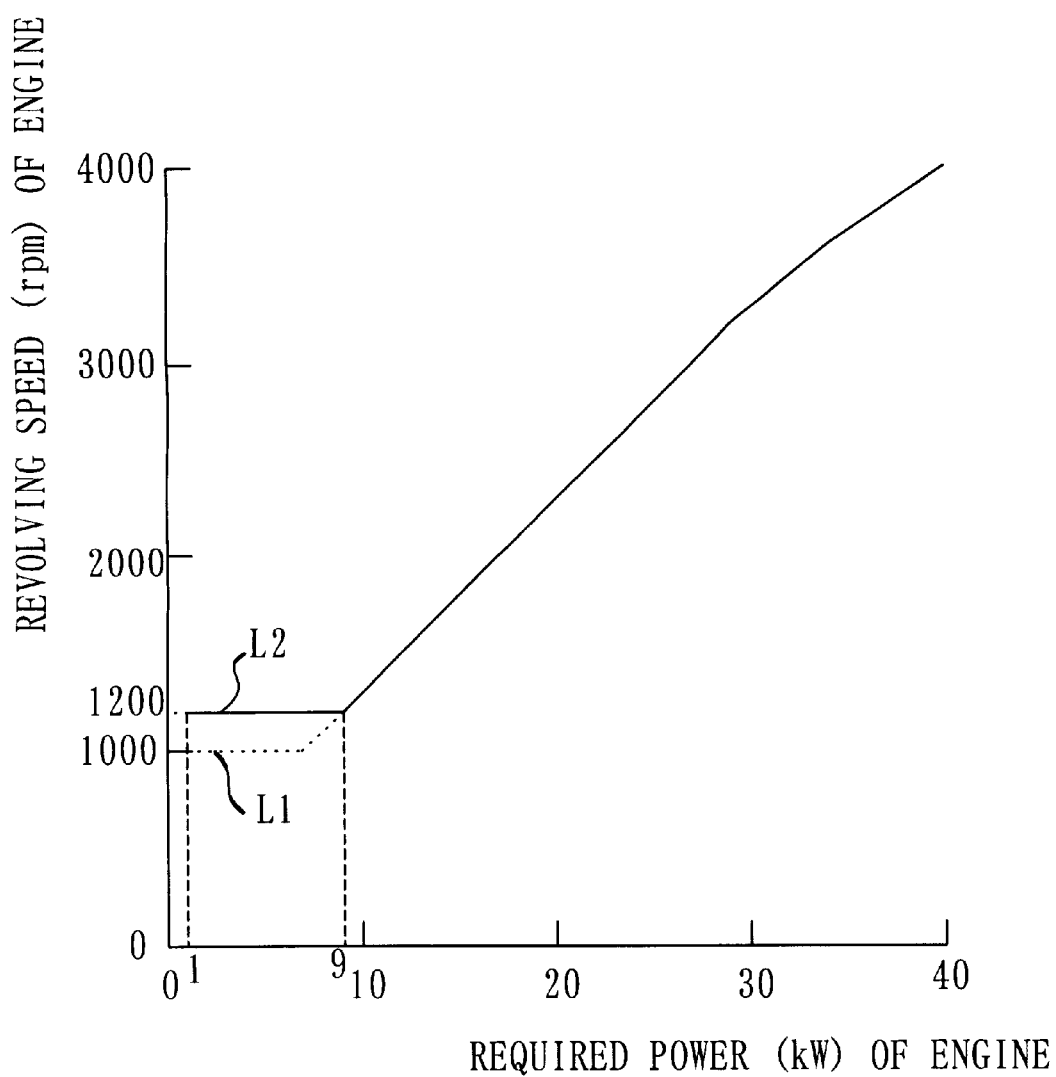
FIG. 6 is a graph showing a relationship between the required power and the target revolving speed of the engine.

When the engine 150 is neither in the idle driving state nor in the motoring state, that is, in the loaded driving state, on the other hand, the CPU refers to a target revolving speed setting table and sets the target revolving speed netag of the engine 150 based on the required power Pe at step S220. FIG. 6 is a graph showing a relationship between the required power Pe (kW) and the target revolving speed netag (rpm). In the actual state, this graph is stored in the form of a table in the ROM of the control unit 190. A concrete procedure of step S220 reads this target revolving speed setting table, carries out interpolation if necessary, and thereby determines the target revolving speed netag of the engine 150 corresponding to the input required power Pe.

As clearly understood from the graph of FIG. 6, the target revolving speed netag is fixed to a constant value 1200 rpm while the required power Pe is in the range of 1 to 9. This fixed target revolving speed 1200 rpm in the loaded driving state is greater than the target revolving speed 1000 rpm in the idle driving state or in the motoring state. In the range where the required power Pe is greater than 9, the target revolving speed netag increases with an increase in required power Pe. In this range, the target revolving speed netag is specified by selecting the driving point of the highest driving efficiency of the engine 150 as discussed below.

Figure 7:
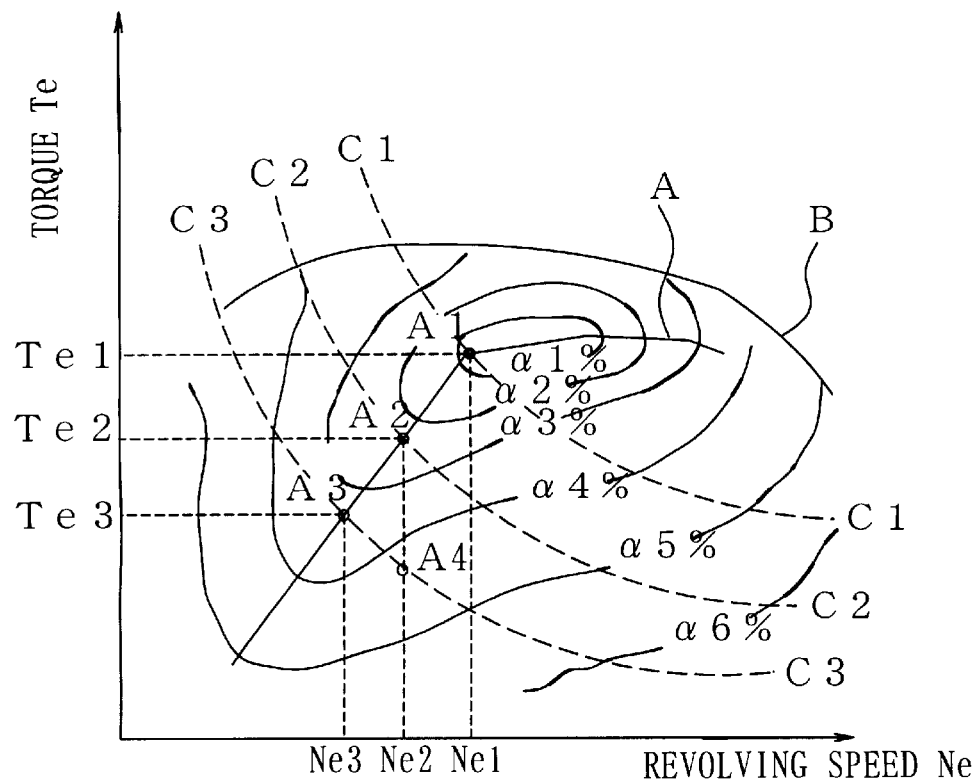
FIG. 7 is a graph showing the relationship between the driving point of the engine and the driving efficiency.

FIG. 7 is a graph showing the relationship between the driving point of the engine 150 and the driving efficiency. A curve B denotes the limit of the revolving speed and the torque allowable for operation of the engine 150. Curves shown as α1%, α2%, and the like denote the equal-efficiency lines, on which the efficiency of the engine 150 is fixed. The efficiency decreases in the order of α1%, α2%, . . . . As clearly shown in the graph of FIG. 7, the efficiency of the engine 150 is high in a relatively restricted range of the driving points and gradually decreases with an increase in distance from the range.

Figure 8:
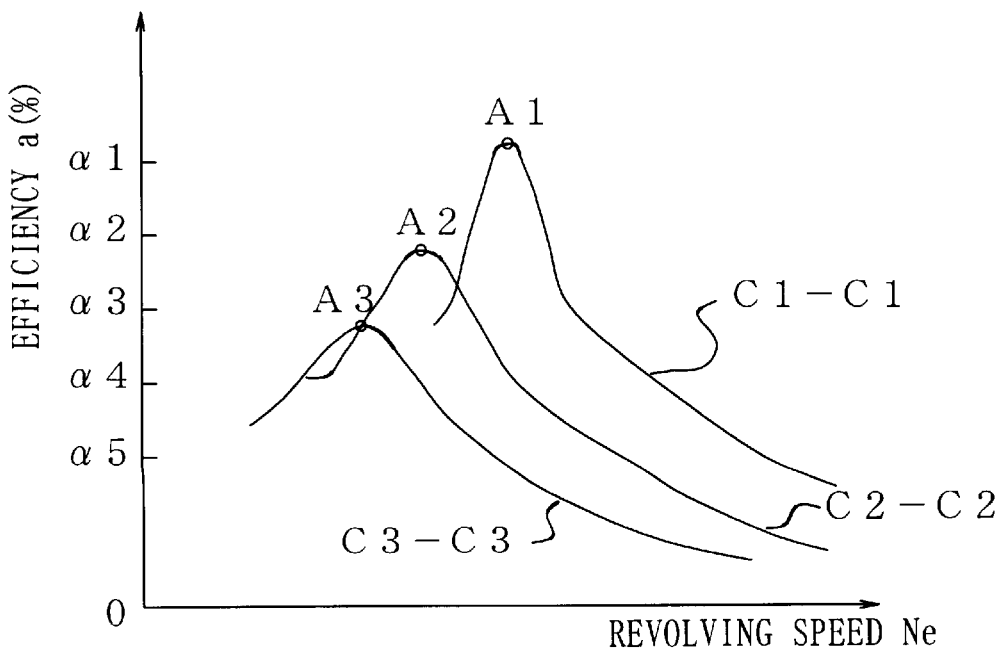
FIG. 8 is a graph showing the relationship between the revolving speed of the engine and the driving efficiency on the equal-power curves on which the required power is fixed.

Curves C1—C1, C2—C2, and C3—C3 denote equal-power curves, on which the power output from the engine 150 is fixed. The driving point of the engine 150 should be selected on these curves according to the required power. The required power decreases in the order of C1—C1, C2—C2, C3—C3. When a required revolving speed Nr and a required torque Tr are plotted on the curve C1—C1, for example, the selected driving point of the engine 150 is a point A1, which gives the highest driving efficiency on the curve C1—C1. In a similar manner, the selected driving point is a point A2 on the curve C2—C2 and a point A3 on the curve C3—C3. FIG. 8 is a graph showing the relationship between the revolving speed of the engine 150 and the driving efficiency on the respective curves C1—C2, C2—C2, and C3—C3. Although only three curves C1—C1, C2—C2, C3—C3 and three driving points A1, A2, A3 are shown for convenience of explanation, any number of curves can be drawn and any number of driving points of the engine 150 can be selected according to the required power. Successively joining the points of the high driving efficiency of the engine 150 gives a curve A shown in the graph of FIG. 7. Such a curve as the curve A is called a working curve. The graph of FIG. 6 shows part of the working curve with the required power plotted as abscissa and the target revolving speed as ordinate.

As clearly understood from the graph of FIG. 6, when the engine 150 is driven at the driving point of the high driving efficiency, the target revolving speed decreases with a decrease in required power. In the case of the engine 150 of the embodiment, the minimum revolving speed for stable operation is 1000 rpm as described previously. If the priority is given to the driving efficiency of the engine 150, the relationship between the required power Pe and the target revolving speed netag may include the value '1000 rpm'. This is specified by a curve L1 shown by the broken line in FIG. 6. This embodiment, however, sets the revolving speed 1200 rpm to the lower limit as specified by another curve L2 shown by the solid line in FIG. 6.

In the graph of FIG. 7, Ne3=1000 rpm and Ne2=1200 rpm. When the required power corresponds to the curve C3—C3, the engine 150 is driven at a driving point A3 in the graph of FIG. 7 when the target revolving speed of the engine 150 is equal to 1000 rpm and at a driving point A4 when the target revolving speed is equal to 1200 rpm. This clearly shows that setting the lower limit of the target revolving speed of the engine 150 equal to 1200 rpm is disadvantageous from the viewpoint of the driving efficiency of the engine 150. The significance of such setting in this embodiment will be described later with the effects of the embodiment.

The procedure discussed above specifies the target revolving speed netag according to the driving state of the engine 150. The CPU then causes the specified target revolving speed netag to undergo a revolving speed restriction process at step S230. The revolving speed restriction process includes two different restrictions.

The first restriction regards limitation of the revolving speed of the engine 150 shown in the graph of FIG. 2. This limitation depends upon the revolving speed of the ring gear shaft 126, since the planetary gear 120 is linked with the crankshaft 156 of the engine 150. When the target revolving speed netag exceeds the limit value of FIG. 2, the CPU corrects the target revolving speed netag to the limit value.

The second restriction regards the rate of change of the target revolving speed netag. For the stable operation of the engine 150, the rate of change in target revolving speed netag should be in the range where the control of the engine 150 by the EFIECU 170 can follow. In this gentle variation process, the CPU reads the previous target revolving speed obtained in the previous cycle of this routine from the memory of the control unit 190 and corrects the target revolving speed netag, in order to make the difference between the current target revolving speed netag set in the current cycle of this routine and the previous target revolving speed within a predetermined range.

After setting the target revolving speed netag, the CPU calculates a target torque Te of the engine 150 at step S300 in the flowchart of FIG. 3. The target torque Te is calculated from the required power Pe and the target revolving speed netag according to the equation of Te=Pe/netag. The CPU accordingly sets the driving point of the engine 150 defined by the target revolving speed netag and the target torque Te.

At subsequent step S400, the CPU calculates a target revolving speed Ns of the sun gear shaft 125 from the target revolving speed netag of the engine 150 thus obtained. In the planetary gear 120, the revolving speed Nr of the ring gear shaft 126 is determined according to the required revolving speed of the drive shaft 112, and the revolving speed Nc of the planetary carrier shaft 127 is equal to the target revolving speed netag of the engine 150. Equation (1) is rewritten as Equation (2) given below by substituting these values, and the target revolving speed Ns of the sun gear shaft 125 is calculated according to Equation (2):

$$Ns=netag+(netag-Nr)/\rho \qquad (2)$$

The CPU carries out control of the motor MIGI based on the target revolving speed Ns of the sun gear shaft 125 calculated in the above manner at step S500. The motor MG1 is controlled by the PI control method, which sets the target torque of the motor MG1 according to the difference between the target revolving speed Ns and the actual revolving speed of the sun gear shaft 125. In the case where the target revolving speed Ns is greater than the actual revolving speed of the sun gear shaft 125, the target torque of the motor MG1 has a positive value. In the opposite case, the target torque of the motor MG1 has a negative value. The method of controlling a synchronous motor according to the target torque and the revolving speed is known in the art and thereby not specifically described here.

In a similar manner, the CPU carries out PI control of the motor MG2 at step S600. The revolving speed of the motor MG2 is determined according to the required revolving speed of the drive shaft 112. Like in the case of the motor M(G1, the target torque of the motor MG2 is set based on the difference between the target revolving speed and the actual revolving speed.

The CPU subsequently carries out control of the engine 150 at step S700. The control procedure for enabling the engine 150 to be driven at the specified driving point is known in the art and thereby not specifically described here. The control of the engine 150 is actually executed by the EFIECU 170. The actual procedure carried out at step S700 in the torque control routine is thus transmission of required pieces of information, such as the driving point of the engine 150, from the control unit 190 to the EFIECU 170.

The power output apparatus of the embodiment prevents an abrupt change of the output torque of the motor MG1 in a transient period when the driving condition of the engine 150 is shifted from the loaded driving state to the non-loaded driving state, and thereby reduces the shock in the transient period. Besides there is no need of changing the contents of the torque control process, whether or not the driving state of the engine 150 is in the transient period, as discussed below with the drawing of FIG. 9.

Figure 9:
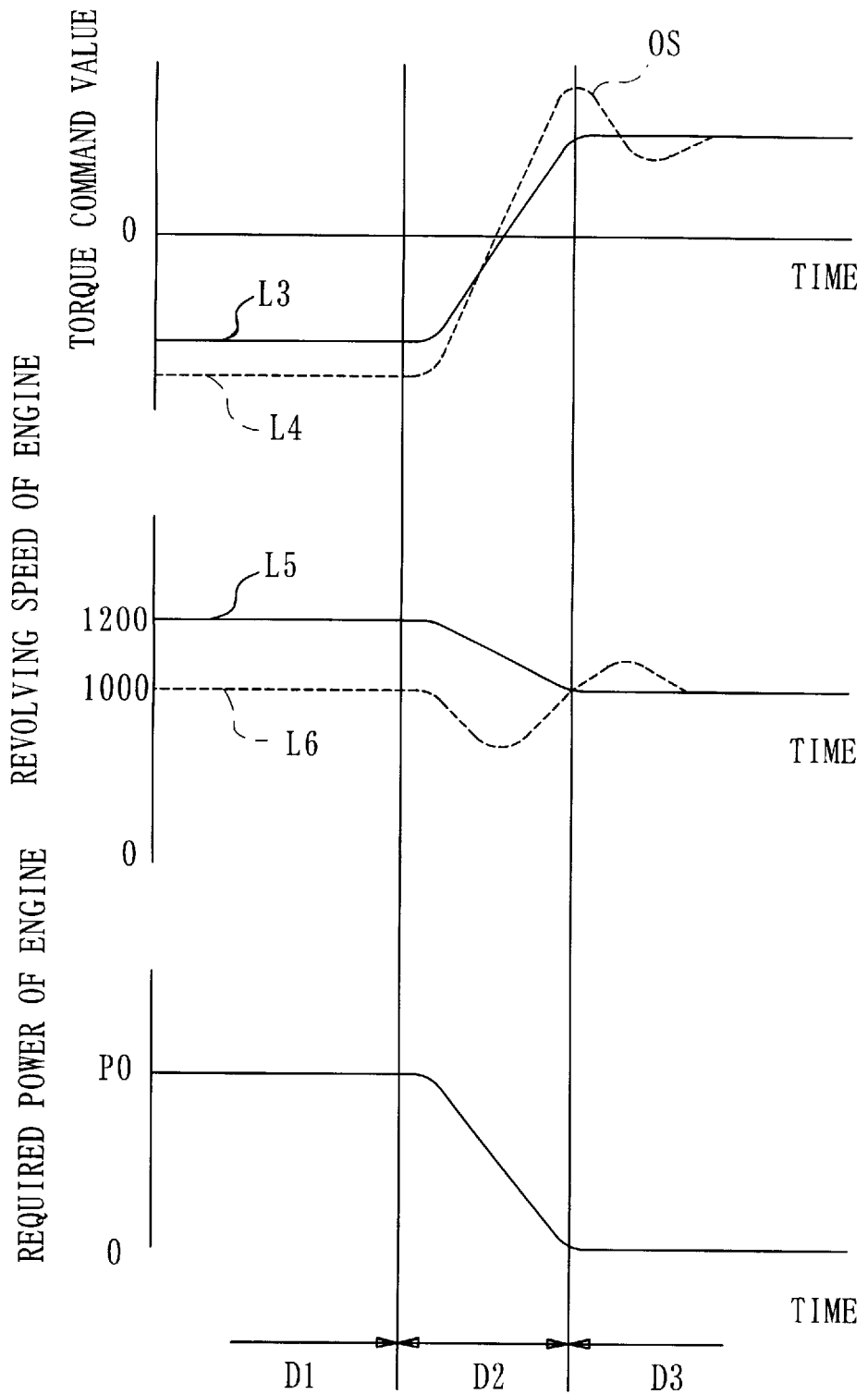
FIG. 9 is a graph showing variations of the respective parameters in a transient period when the driving condition of the engine is shifted from a loaded driving state to a non-loaded driving state.

The graph of FIG. 9 shows variations in torque command value of the motor MG1, revolving speed of the engine 150, and required power of the engine 150 when the driving condition of the engine 150 is shifted from the loaded driving state (a district D1 in FIG. 9) to the non-loaded driving state (a district D3) via the transient period (a district D2). As shown in the graph of FIG. 6, the revolving speed of the engine 150 varies with a variation in required power Pe. In the example of FIG. 9, the effect of a shock due to a torque variation of the motor MG1 significantly appears when the engine 150 is driven at the minimum revolving speed in the loaded driving state. Solid curves L3 and L5 represent variations in torque command value and revolving speed of the engine 150 in the arrangement of this embodiment (the curve L2 in FIG. 6). Broken curves L4 and L6 represent variations in torque command value and revolving speed of the engine 150 when it is assumed that the minimum revolving speed of the engine 150 is set equal to 1000 rpm (the curve L1 in FIG. 6) in the loaded driving state.

As shown in FIG. 9, when the engine 150 is in the loaded driving state, that is, in the district D1, the motor MG1 generates electricity and has a negative output torque. Compared with the arrangement of the embodiment in which the minimum revolving speed of the engine 150 is set equal to 1200 rpm (the curve L3), the arrangement in which the minimum revolving speed of the engine 150 is set equal to 1000 rpm (the curve L4) requires a further restriction of the revolving speed of the engine 150 and thereby causes a smaller output torque of the motor MG1 (but a greater absolute value).

When the driving condition of the engine 150 is shifted from the loaded driving state to the non-loaded driving state, that is, to the district D3, the motor MG1 has a positive output torque. In the transient period of the district D2, the torque command value smoothly varies in the arrangement of the embodiment, whereas the torque command value abruptly varies and causes an overshoot (OS in FIG. 9) in the case of the minimum revolving speed equal to 1000 rpm.

The following describes the cause of this phenomenon based on the variations in revolving speed and required power of the engine 150. The motor MG1 is under the PI control as described previously. When the minimum revolving speed of the engine 150 is equal to 1000 rpm (the curve L4), the minimum revolving speed coincides with the target revolving speed of the engine 150 in the non-loaded driving state (the district D3), so that the motor MG1 tries to maintain the torque under such conditions. When the required power of the engine 150 decreases in the district D2, the negative torque of the motor MG1 causes a decrease in revolving speed of the engine 150 as shown by the curve L6. The decrease in revolving speed of the engine 150 causes the motor MG1 to output a positive torque, in order to raise the revolving speed of the engine 150 to the target revolving speed. This results in an abrupt rise of the torque as shown by the curve L4.

In the arrangement of the embodiment, on the other hand, the revolving speed of the engine 150 in the loaded driving state is greater than the target revolving speed of the engine 150 in the non-loaded driving state as shown by the curve L5. Even when the negative torque of the motor MG1 causes a decrease in revolving speed of the engine 150 in the transient period, the revolving speed of the engine 150 does not become lower than the target revolving speed, so that there is no abrupt change of the torque of the motor MG1, as shown by the curves L3 and L5.

As discussed above, the power output apparatus of the embodiment does not cause an abrupt change of the torque of the motor MG1 but realizes a gentle variation in torque in the transient period, thereby attaining the good ride of the hybrid vehicle. When the engine 150 has a low revolving speed in the loaded driving state as shown in the example of FIG. 9, that is, when the hybrid vehicle is at a stop or runs at a low speed, the driver and the passenger tends to feel even a slight shock. The arrangement of the embodiment especially has significant effects in such cases.

Another advantage of this embodiment is to reduce the rattling noise occurring between the gears in the planetary gear 120. This effect may be ascribed to the following reason though not being apparent perfectly, since the cause of the rattling noise itself has not yet been elucidated.

In the planetary gear 120 used in this embodiment, there is naturally looseness or play between the respective gears. In the course of substantially steady rotation, the tooth face of one gear is pressed against the tooth face of another gear engaging therewith. A torque variation of the motor MG 1 under such conditions changes the engagement of the gears and causes a collision of the tooth face of one gear against the tooth face of another gear. When there is a large torque variation of the motor MG1 and there is an overshoot OS as shown by the curve L4 in FIG. 9, the gears rather violently collide with each other many times. It is through that this causes the rattling noise. The structure of the embodiment, on the other hand, realizes a gentle torque variation of the motor MG1 and enables rotation of the gears while the tooth face of one gear is pressed against the tooth face of another gear engaging therewith. This arrangement effectively prevents a collision of the gears or at least relieves the intensity of the collision, thereby reducing the rattling noise.

As discussed above, the power output apparatus of the embodiment sets the minimum revolving speed of the engine 150 in the loaded driving state to be greater than the target revolving speed of the engine 150 in the non-loaded driving state by a predetermined value, thereby enabling a gentle variation in torque of the motor MG1. The predetermined value is set equal to 200 rpm in this embodiment. The predetermined value is closely related to the response of the motor MG1 to the PI control and the negative torque output from the motor MG1 in the loaded driving state of the engine 150. The predetermined value should thus be set experimentally according to these values. For the purpose of decreasing the torque variation of the motor MG1 in the transient period, it is desirable to set a greater value to the minimum revolving speed of the engine 150 in the loaded driving state. The greater minimum revolving speed, however, is disadvantageous from the viewpoint of the driving efficiency of the engine 150 as described previously. It is accordingly preferable that the minimum revolving speed of the engine 150 in the loaded driving state is set to a value as small as possible in the allowable range that realizes a gentle torque variation of the motor MG1.

The embodiment adopts the technique of restricting the minimum revolving speed of the engine 150 in the loaded driving state as the easiest method of reducing a torque variation of the motor MG1, since this method does not require any modification of the torque control routine, whether or not the engine 150 is in the transient period. Another method may, however, be applied to reduce a torque variation of the motor MG1 as discussed below.

A first application is the technique of controlling the motor MG1 in the transient period not by the Pi control but by the open-loop control. As clearly shown in FIG. 9, the output torque of the motor MG1 varies from negative to positive in the transient period. The open-loop control of the first application gradually increases the output torque of the motor MG1 in the transient period at a predetermined rate within the allowable range that does not cause a shock due to the torque variation, irrespective of the revolving speed of the engine 150. The control procedure of the motor MG1 is returned from the open-loop control to the PI control at the time when the torque of the motor MG1 gradually increases in the transient period and the revolving speed of the engine 150 reaches a specific range close to the target revolving speed.

A second application is the technique of making the torque command value of the motor MG1 in the transient period subjected to a variation limiting process. The variation limiting process corrects the torque command value of the motor MG1 set under the PI control, in order to make the quantity of change per unit time not greater than a predetermined level. One concrete procedure of the variation limiting process multiplies the previous torque command value obtained in the previous cycle and the current torque command value obtained in the current cycle by weighting coefficients and calculating the mean of the products. This variation limiting process restricts the torque variation of the motor MG1 within a predetermined range of variation, thereby reducing the shock.

A third application is the technique of making the response of the motor MG1 to the PI control slower than the response of the motor MG2 to the PI control. As described previously, in the hybrid vehicle with the motors MG1 and MG2, the torque command value of the motor MG2 is set to make the torque output from the drive shaft 112 coincident with the required torque. If the control of the motor MG2 sufficiently follows a torque variation of the motor MG1, there is no shock due to the torque variation. In the actual state, however, the response of the motor MG1 to the control is substantially equal to the response of the motor MG2. There is accordingly a certain time delay before the control of the motor MG2 follows the torque variation of the motor MG1. This time delay results in a shock due to the torque variation. The structure of the third application makes the response of the motor MG1 to the PI control slower than the response of the motor MG2 and thereby enables the control of the motor MG2 to sufficiently follow the torque variation of the motor MG1, so as to cancel the shock. A variety of methods may be applicable to make the response of the motor MG1 to the control slower than the response of the motor MG2. One available method changes the gain used for calculation of the torque command value of the motor MG1. Another available method causes the torque command value of the motor MG1 to undergo the variation limiting process. Still another available method makes the cycle of controlling the motor MG1 longer than the cycle of controlling the motor MG2.

In any of the above applications, the engine 150 can be driven at the driving point of the high driving efficiency in the loaded driving state. Compared with the embodiment discussed above, these applications cause a little time delay before the revolving speed of the engine 150 reaches the target revolving speed. This problem is, however, not significant since the strict regulation of the revolving speed of the engine 150 is not required in the non-loaded driving state.

In the power output apparatus of the embodiment, the torque control routine is executed to prevent an abrupt change of the torque of the motor MG1 in the transient period when the driving condition of the engine 150 is shifted from the loaded driving state to the non-loaded driving state. The torque control routine may also be applied to the transient period when the driving condition of the engine 150 is shifted from the non-loaded driving state to the loaded driving state. In this case, the target revolving speed of the engine 150 in the loaded driving state is set to be greater than the minimum revolving speed of the engine 150 in the non-loaded driving state in the same manner as that shown in FIG. 6. This arrangement effectively prevents an abrupt change of the torque of the motor MG1 in the transient period from the non-loaded driving state to the loaded driving state and reduces the shock.

These effects are clearly understood when the graph of FIG. 9 is observed in the sequence of the districts D3, D2, and D1. When the driving condition of the engine 150 is shifted from the non-loaded driving state (the district D3) to the loaded driving state (the district D1), the required power of the engine 150 increases as shown in FIG. 9. The motor MG1 outputs a predetermined positive torque in the non-loaded driving state, which works to increase the revolving speed of the engine 150. When the target revolving speed of the engine 150 in the loaded driving state is set to be greater than the minimum revolving speed of the engine 150 in the non-loaded driving state, the output torque of the motor MG1 does not abruptly change but varies smoothly as shown in FIG. 9.

The respective elements of the power output apparatus may have a variety of configurations other than those discussed in the above embodiment. For example, permanent magnets (PM)-type synchronous motors are used for the motors MG1 and MG2 in the embodiment. Any other motors which can implement both the regenerative operation and the power operation, such as variable reluctance (VR)-type synchronous motors, vernier motors, d.c. motors, induction motors, superconducting motors, and stepping motors, may, however, be used for the motors MG1 and MG2 according to the requirements.

Figure 10:
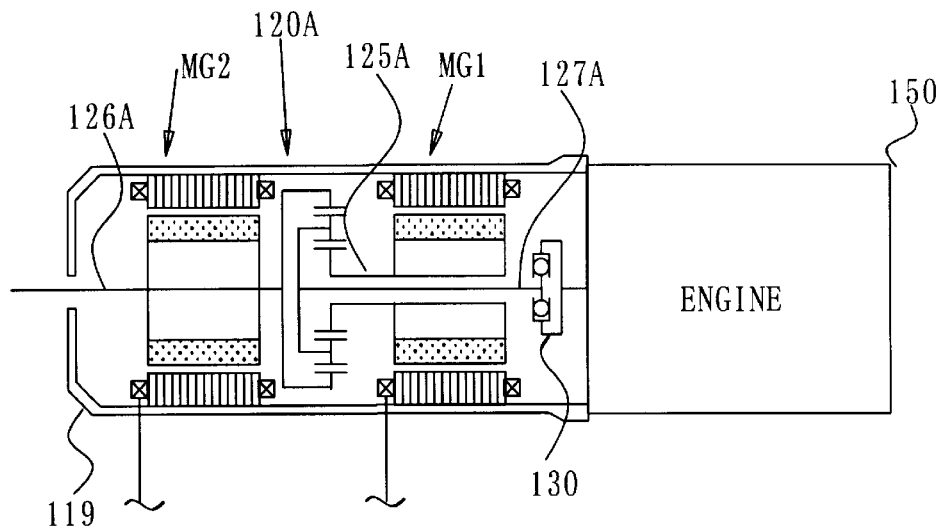
FIG. 10 shows a first modified configuration of the hybrid vehicle that adopts mechanical distribution.
Figure 11:
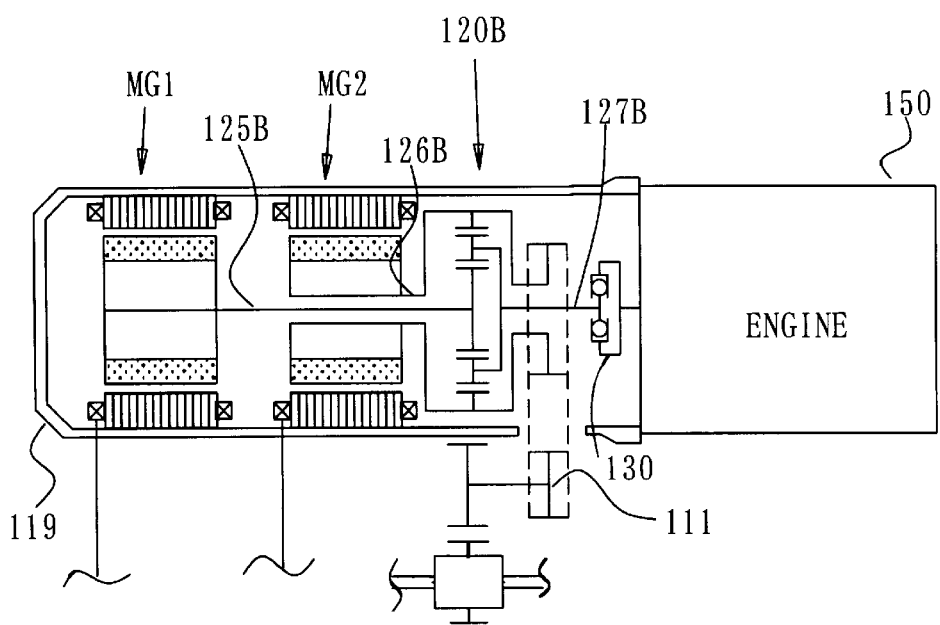
FIG. 11 shows a second modified configuration of the hybrid vehicle that adopts mechanical distribution.

There are other possible configurations of the hybrid vehicle with the power output apparatus of the embodiment mounted thereon. In the hybrid vehicle of the configuration shown in FIG. 1, the driving force of the engine 150 and the motor MG2 is transmitted to the driving wheels 116 and 118 via the planetary gear 120. Modified configurations as shown in FIGS. 10 and 11 may also be applied for the connection of the planetary gear 120 with the engine 150 and the motors MG1 and MG2. In the structure of FIG. 1, the power output to the ring gear shaft 126 is taken out of the portion between the motors MG1 and MG2 via the power feed gear 128 connected with the ring gear 122. In the modified structure of FIG. 10, the power is taken out of an extended ring gear shaft 126A. In the modified structure of FIG. 11, the engine 150, a planetary gear 120B, the motor MG2, and the motor MG1 are arranged in this order. In this case, a sun gear shaft 125B may not be hollow, while a ring gear shaft 126B should be hollow. In this structure, the power output to the ring gear shaft 126B is taken out of the portion between the engine 150 and the motor MG2. Although not specifically illustrated, the motor MG2 and the motor MG1 may be replaced with each other in the structure of FIG. 10.

In the modified structure where the motor MG2 applies a load to the engine 150, which is in the loaded driving state, the principle of the present invention is applied to the torque control that prevents an abrupt change of the torque of the motor MG2 instead of the motor MG1.

Figure 12:
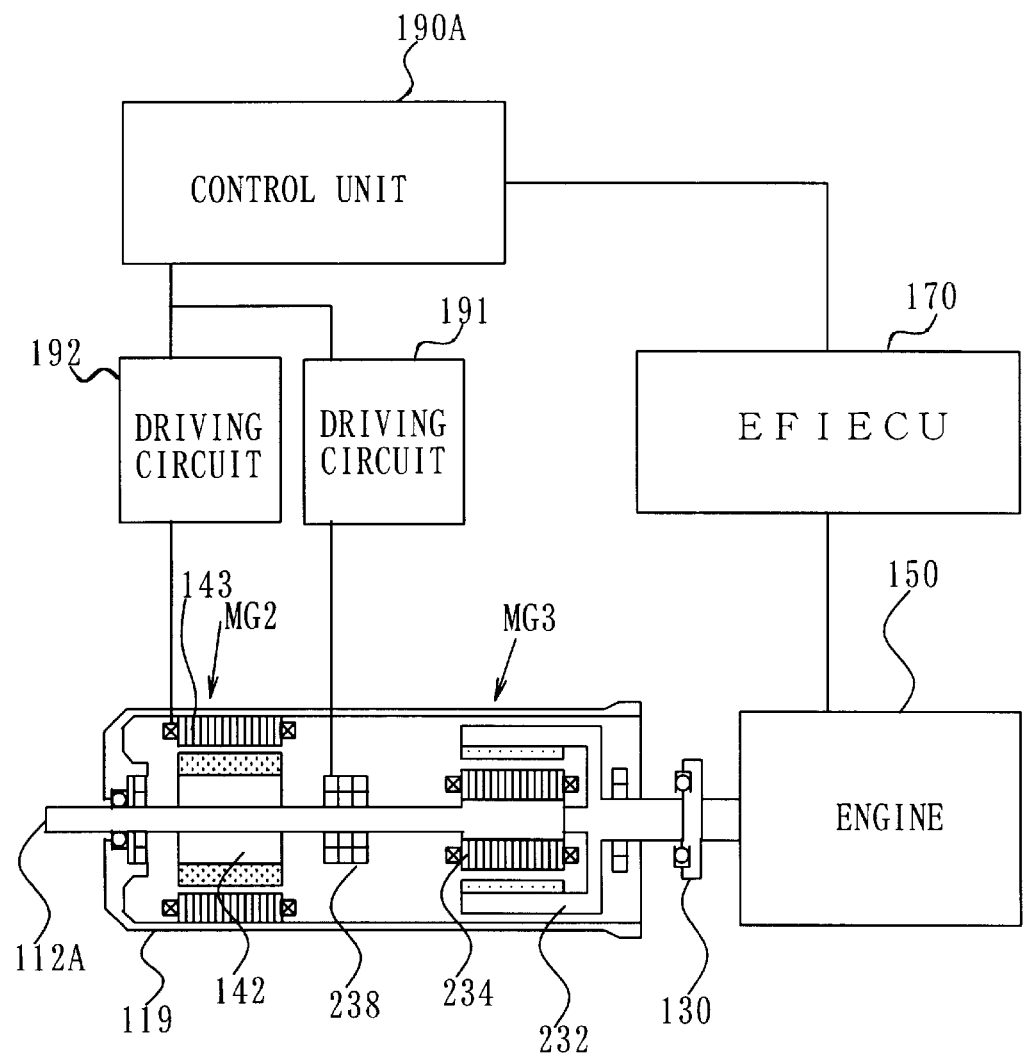
FIG. 12 shows the structure of another hybrid vehicle that adopts electrical distribution.

The principle of the present invention may be applied to another configuration that does not include the planetary gear 120 as shown in FIG. 12. In the structure of FIG. 12, the motor MG1 and the planetary gear 120 in the structure of FIG. 1 are replaced with a clutch motor MG3, which includes a rotor (inner rotor) 234 and a stator (outer rotor) 232 that are rotatable relative to an identical axial center and function as electromagnetic coupling. The outer rotor 232 of the clutch motor MG3 is mechanically linked with the crankshaft 156 of the engine 150. The inner rotor 234 of the clutch motor MG3 and the rotor 142 of the motor MG2 are connected with a drive shaft 112A, whereas the stator 143 of the motor MG2 is fixed to the casing 119.

In the hybrid vehicle of this modified structure, the clutch motor MG3 applies a load to the engine 150. The principle of the present invention is thus applied to the torque control that prevents an abrupt change of the torque of the clutch motor MG3.

Figure 13:
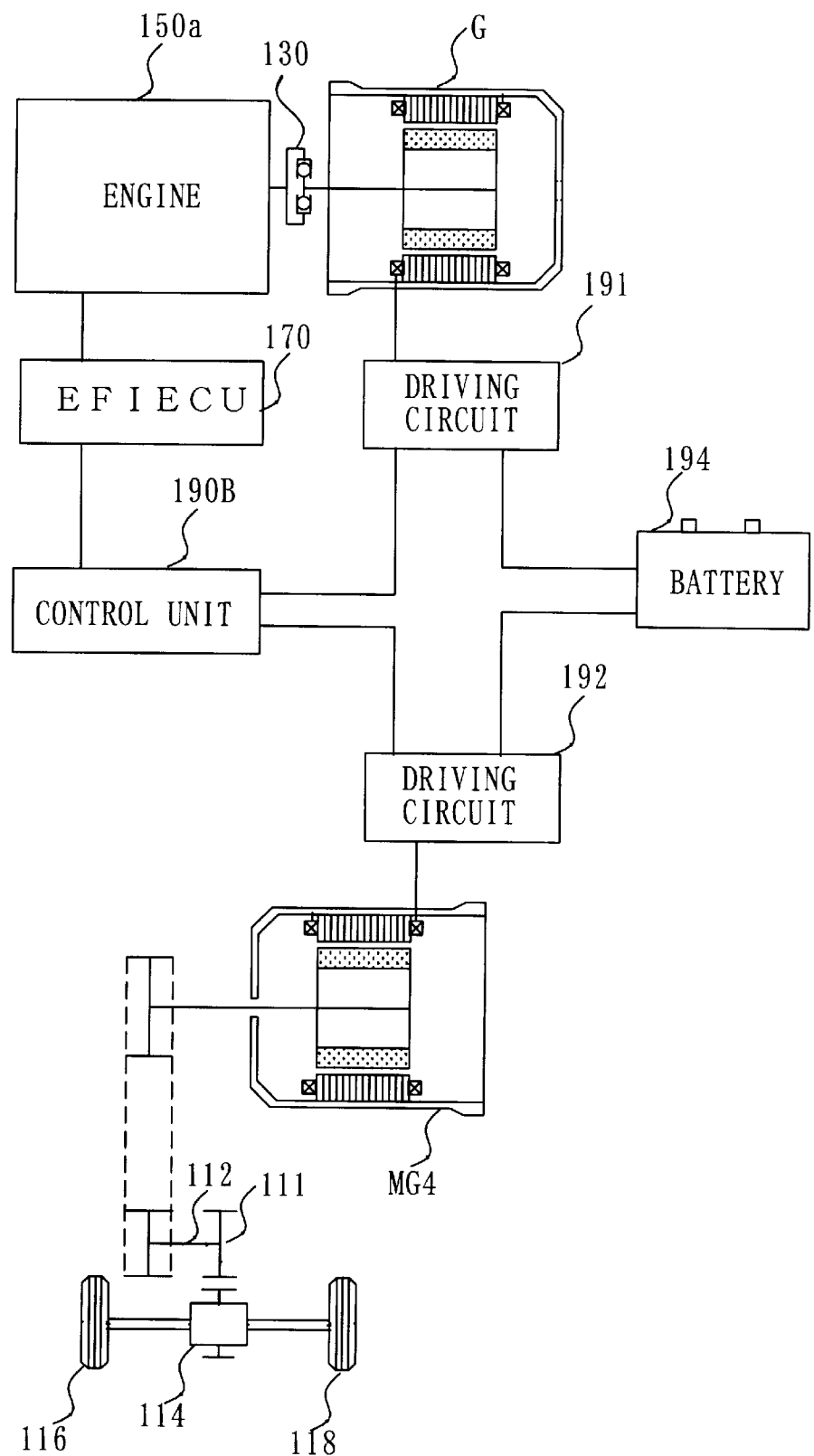
FIG. 13 shows the structure of a series-type hybrid vehicle.

The hybrid vehicle may have a series-type configuration as shown in FIG. 13. In the series-type hybrid vehicle, the output shaft of the engine 150 is mechanically connected with a generator G, which may also work as a motor. A motor MG4 is connected to the driving wheels 116 and 118 via the power transmission gear 111, whereas the engine 150 is not linked with the driving wheels 116 and 118. The power of the engine 150 is accordingly not transmitted to the driving wheels 116 and 118 but is used to drive the generator G. The vehicle is driven by the motor MG4 using the electric power stored in the battery 194.

In the series-type hybrid vehicle, the principle of the present invention is applied to the torque control that prevents an abrupt change of the torque of the generator G. In the series-type hybrid vehicle, although the torques of the engine 150 and the generator G are not directly transmitted to the drive shaft 112, the driver and the passenger feel the shock due to an abrupt change of the torque of the generator G transmitted via the vehicle body. The present invention for reducing the shock is thus effective in this series-type hybrid vehicle.

The principle of the present invention is also applicable to the conventional vehicle that uses only the engine 150 as the power source but includes a large-scaled dynamo for power generation. The present invention is not restricted to the above embodiment or its modifications, but there may be many other modifications, changes, and alterations without departing from the scope or spirit of the main characteristics of the present invention.

It should be clearly understood that the above embodiment is only illustrative and not restrictive in any sense. The scope and spirit of the present invention are limited only by the terms of the appended claims.

What is claimed is:

1. A power output apparatus having an internal combustion engine and a motor generator that is mechanically connected with said internal combustion engine and applies a significant load onto said internal combustion engine, said power output apparatus comprising:

a torque variation restricting unit that controls said internal combustion engine and said motor generator, in order to restrict a variation in torque output from said motor generator in a transient period to or below a predetermined level, in said transient period, a driving condition of said internal combustion engine being shifted from a loaded driving state, in which a load is applied to said internal combustion engine by said motor generator, to a non-loaded driving state, in which no load is applied to said internal combustion engine.

2. A power output apparatus in accordance with claim 1, wherein said torque variation restricting unit controls said internal combustion engine and said motor generator in the loaded driving state, so as to keep a minimum revolving speed of said internal combustion engine in the loaded driving state at a specific level that is greater than a target revolving speed in the non-loaded driving state by a predetermined value.

3. A power output apparatus in accordance with claim 2, said power output apparatus further comprising a motor generator control unit that feed-back controls operation of said motor generator based on an observed revolving speed of said internal combustion engine, wherein the predetermined value in said torque variation restricting unit depends upon a decrease in revolving speed of said internal combustion engine due to a time delay of control of said motor generator.

4. A power output apparatus in accordance with claim 1, wherein said motor generator is a first motor generator, and said motor generator control unit is a first motor generator control unit, said power output apparatus further comprising:

a drive shaft for outputting power;

a second motor generator that applies a torque to said drive shaft; and a second motor generator control unit that regulates a torque output from said second motor generator, in order to cause a torque output from said drive shaft to be coincident with a required torque, wherein said torque variation restricting unit feed-back controls operation of said first motor generator at a specific speed of response that is lower than a speed of response of said second motor generator control unit.

5. A power output apparatus in accordance with claim 1, said power output apparatus further comprising:

a drive shaft for outputting power; and a planetary gear having three rotating shafts, wherein said three rotating shafts of said planetary gear are respectively connected with said internal combustion engine, said motor generator, and said drive shaft.

6. A power output apparatus having an internal combustion engine and a motor generator that is mechanically connected with said internal combustion engine and applies a significant load onto said internal combustion engine, said power output apparatus comprising:

a motor generator control unit that feed-back controls operation of said motor generator based on a revolving speed of said internal combustion engine; and an internal combustion engine control unit that controls said internal combustion engine, so as to keep a minimum revolving speed of said internal combustion engine in a loaded driving state at a specific level that is greater than a target revolving speed in a non-loaded driving state by a predetermined value, wherein a load is applied to said internal combustion engine by said motor generator in the loaded driving state, whereas no load is applied to said internal combustion engine in the non-loaded driving state.

7. A method of controlling a power output apparatus having an internal combustion engine and a motor generator that is mechanically connected with said internal combustion engine and applies a significant load onto said internal combustion engine, said method comprising the steps of:

(a) driving said internal combustion engine and said motor generator in a loaded driving state where a load is applied to said internal combustion engine by said motor generator;

(b) driving said internal combustion engine and said motor generator in a non-loaded driving state where no load is applied to said internal combustion engine; and (c) controlling said internal combustion engine and said motor generator, in order to restrict a variation in torque output from said motor generator to or below a predetermined level, in a transient period between said step (a) and said step (b).

* * * * *